United States Patent
Numajiri

(10) Patent No.: US 8,313,266 B2
(45) Date of Patent: Nov. 20, 2012

(54) CONSTRUCTION METHOD AND CONSTRUCTION APPARATUS FOR OFFSHORE WIND TURBINE GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 211 days.

(21) Appl. No.: 12/513,694

(22) PCT Filed: Aug. 28, 2008

(86) PCT No.: PCT/JP2008/065396
§ 371 (c)(1),
(2), (4) Date: Jun. 2, 2009

(87) PCT Pub. No.: WO2010/023743
PCT Pub. Date: Mar. 4, 2010

(65) Prior Publication Data
US 2011/0119889 A1    May 26, 2011

(51) Int. Cl.
*B63B 35/00* (2006.01)
(52) U.S. Cl. .................. 405/204; 405/195.1
(58) Field of Classification Search ........... 405/195.1, 405/203, 204, 209
See application file for complete search history.

(56) References Cited

U.S. PATENT DOCUMENTS

| | | | |
|---|---|---|---|
| 4,286,346 A | 9/1981 | Wiek | |
| 4,683,832 A * | 8/1987 | Dysarz | 405/209 |
| 5,097,786 A | 3/1992 | Sheffield | |
| 6,550,411 B1 | 4/2003 | Den Hartogh et al. | |
| 6,923,598 B2 * | 8/2005 | Vatsvåg | 405/203 |
| 7,112,010 B1 * | 9/2006 | Geiger | 405/203 |
| 7,207,777 B2 | 4/2007 | Bervang | |
| 7,293,960 B2 * | 11/2007 | Yamamoto et al. | 60/496 |
| 7,762,744 B2 * | 7/2010 | Natvig | 405/209 |
| 2004/0258483 A1 * | 12/2004 | Vatsvag | 405/203 |
| 2005/0286979 A1 * | 12/2005 | Watchorn | 405/203 |
| 2006/0120809 A1 | 6/2006 | Ingram et al. | |
| 2010/0143046 A1 * | 6/2010 | Olsen et al. | 405/209 |

FOREIGN PATENT DOCUMENTS

| | | |
|---|---|---|
| CN | 1688808 A | 10/2005 |
| CN | 101196177 A | 6/2008 |
| JP | 3-64895 U | 6/1991 |
| JP | 2003-293938 A | 10/2003 |
| JP | 2006037397 A | 2/2006 |
| WO | 2007091042 A1 | 8/2007 |

OTHER PUBLICATIONS

International Search Report of Application No. PCT/JP2008/065396 mailed Dec. 9, 2008.
Chinese Office Action for CN 200880001209.2, dated Mar. 26, 2012.
Decision for Grant of Patent issued Aug. 28, 2012 for Korean Patent Application No. 10-2009-7011547 with English Translation.

\* cited by examiner

*Primary Examiner* — Frederick L Lagman
(74) *Attorney, Agent, or Firm* — Kanesaka Berner & Partners

(57) ABSTRACT

Provided is a construction apparatus for safe and smooth construction of a floating offshore wind turbine generator in deep sea. The construction apparatus for constructing the offshore wind turbine generator with a crane ship includes a guide member attached to the crane ship in a work position perpendicular thereto such that a bottom end of the guide member is disposed under the sea and at least one pair of arm units that include grippers capable of holding and releasing a tower member divided into a plurality of segments in an axial direction and that slide along the guide member.

16 Claims, 11 Drawing Sheets

PRIOR ART

PRIOR ART

CONSTRUCTION METHOD AND CONSTRUCTION APPARATUS FOR OFFSHORE WIND TURBINE GENERATOR

TECHNICAL FIELD

The present invention relates to a construction method and construction apparatus or a maintenance method and maintenance equipment for an offshore wind turbine generator.

BACKGROUND ART

A conventional offshore wind turbine generator (hereinafter referred to as an "offshore wind turbine") 1 employs, for example, a monopile foundation shown in FIG. 11 or a fixed foundation shown in FIG. 12.

Accordingly, when the offshore wind turbine 1 is constructed, a construction method is employed in which, for example, as shown in FIG. 13, a crane ship S used for construction has its outriggers So lowered onto the seabed to alleviate rolling of the hull due to ocean waves. Reference sign 2 in the drawing denotes a tower member (tower) of the offshore wind turbine generator 1, 3 denotes a nacelle, 4 denotes a rotor head, and 5 denotes a wind turbine blade.

On the other hand, if the construction is carried out using, for example, a crane ship without the outriggers So, the effect of rolling due to ocean waves must generally be reduced by selecting a crane ship larger than those of typical weight, depending on the size of the offshore wind turbine 1.

The above methods for constructing the offshore wind turbine 1, whose foundation is lowered onto the seabed, are means for constructing the offshore wind turbine 1 without causing relative misalignment by immobilizing the crane ship S or avoiding the effect of rolling.

Construction methods and so on for construction of the monopile or fixed offshore wind turbine 1 using the crane ship S are disclosed in, for example, Patent Documents 1 to 3 below.
Patent Document 1:
Japanese Unexamined Patent Application, Publication No. 2006-37397
Patent Document 2: WO 2007/091042 A1
Patent Document 3: U.S. Patent Application, Publication No. 2006/0120809, specification

DISCLOSURE OF INVENTION

However, if an offshore wind turbine is installed in a deep offshore area, it is difficult to lower a foundation of the offshore wind turbine onto the seabed; typically, a floating structure is employed.

To construct a floating offshore wind turbine, a method for avoiding relative misalignment between the crane ship and the offshore wind turbine due to, for example, rolling resulting from ocean waves is essential. That is, without a method for avoiding misalignment, it is extremely difficult to ensure the proper positional relationship between components during, for example, an overhead procedure for joining and mounting a nacelle at the top end of a tower and an overhead procedure for joining and attaching a hub and wind turbine blades to the nacelle at the top end of the tower.

Against the above backdrop, for example, a floating offshore wind turbine for installation in a deep sea area requires a construction method and construction apparatus or a maintenance method and maintenance equipment for an offshore wind turbine generator that allow easy overhead assembly by avoiding misalignment between components.

An object of the present invention, which has been made in light of the above circumstances, is to provide a construction method and construction apparatus or a maintenance method and maintenance equipment for an offshore wind turbine generator that allow safe and smooth construction of a floating offshore wind turbine generator in deep sea.

To solve the above problem, the present invention employs the following solutions.

A construction apparatus of the present invention for an offshore wind turbine generator is a construction apparatus for constructing a floating offshore wind turbine generator with a crane ship, including a guide member attached to the crane ship in a work position perpendicular thereto such that a bottom end of the guide member is disposed under the sea and at least one pair of arm units that include grippers capable of holding and releasing a tower member divided into a plurality of segments in an axial direction and that slide along the guide member.

Because the above construction apparatus for an offshore wind turbine generator includes the guide member attached to the crane ship in the work position perpendicular thereto such that the bottom end of the guide member is disposed under the sea and at least one pair of arm units that include the grippers capable of holding and releasing the tower member divided into the plurality of segments in the axial direction and that slide along the guide member, the arm units can grip the tower member and join it to the crane ship so that construction work can be carried out without relative misalignment resulting from rolling due to ocean waves.

In the above invention, the guide member is preferably attached to the crane ship so as to be rotatable between a sailing position parallel to the crane ship and the work position perpendicular thereto. This prevents the guide member from obstructing sailing of the crane ship.

In the above invention, the guide member preferably has an axially sliding mechanism and/or an extension/retraction mechanism capable of changing the length in the axial direction. This allows the guide member to be lifted out of the sea or its length to be decreased so that it does not obstruct sailing of the crane ship. In addition, the optimum length and position of the guide member for the work conditions can be set by operating the extension/retraction mechanism depending on, for example, the length of the tower member of the offshore wind turbine generator to be constructed.

In the above invention, the arm units preferably include a plurality of sets of grippers whose distance from each other in the axial direction is changeable. This allows the tower member to be reliably gripped even if its length is changed.

A construction method of the present invention for an offshore wind turbine generator is a construction method, for constructing a floating offshore wind turbine generator with a crane ship, in which the offshore wind turbine generator is constructed using the above-described construction apparatus such that the tower member is joined to the crane ship.

In the above construction method for an offshore wind turbine generator, because the offshore wind turbine generator is constructed using the above-described construction apparatus such that the tower member is joined to the crane ship, construction work can be carried out without relative misalignment resulting from rolling due to ocean waves, so that procedures such as alignment are facilitated.

According to the present invention, for example, when a floating offshore wind turbine for installation in a deep sea area is constructed, it can readily be assembled overhead while avoiding misalignment between components. That is, a floating offshore wind turbine generator can be safely and smoothly constructed in deep sea.

Maintenance equipment of the present invention for an offshore wind turbine generator is maintenance equipment for maintaining a floating offshore wind turbine generator with a crane ship, including a guide member attached to the crane ship in a work position perpendicular thereto such that a bottom end of the guide member is disposed under the sea and at least one pair of arm units that include grippers capable of holding and releasing a tower member divided into a plurality of segments in an axial direction and that slide along the guide member.

Because the above maintenance equipment for an offshore wind turbine generator includes the guide member attached to the crane ship in the work position perpendicular thereto such that the bottom end of the guide member is disposed under the sea and at least one pair of arm units that include the grippers capable of holding and releasing the tower member divided into the plurality of segments in the axial direction and that slide along the guide member, the arm units can grip the tower member and join it to the crane ship so that maintenance work can be carried out without relative misalignment resulting from rolling due to ocean waves.

In the above invention, the guide member is preferably attached to the crane ship so as to be rotatable between a sailing position parallel to the crane ship and the work position perpendicular thereto. This prevents the guide member from obstructing sailing of the crane ship.

In the above invention, the guide member preferably has an axially sliding mechanism and/or an extension/retraction mechanism capable of changing the length in the axial direction. This allows the guide member to be lifted out of the sea or its length to be decreased so that it does not obstruct sailing of the crane ship. In addition, the optimum length and position of the guide member for the work conditions can be set by operating the extension/retraction mechanism depending on, for example, the length of the tower member of the offshore wind turbine generator to be maintained.

In the above invention, the arm units preferably include a plurality of sets of grippers whose distance from each other in the axial direction is changeable. This allows the tower member to be reliably gripped even if its length is changed.

A maintenance method of the present invention for an offshore wind turbine generator is a maintenance method, for maintaining a floating offshore wind turbine generator with a crane ship, in which the offshore wind turbine generator is constructed using the above-described maintenance equipment such that the tower member is joined to the crane ship.

In the above maintenance method for an offshore wind turbine generator, because maintenance work is carried out using the above-described maintenance equipment such that the tower member is joined to the crane ship, the maintenance work can be carried out without relative misalignment resulting from rolling due to ocean waves, so that procedures such as alignment are facilitated.

According to the present invention, for example, when a floating offshore wind turbine for installation in a deep sea area is constructed or maintained, it can readily be assembled overhead while avoiding misalignment between components. That is, a floating offshore wind turbine generator can be safely and smoothly constructed or maintained in deep sea.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

EXPLANATION OF REFERENCE SIGNS

Figure 1:
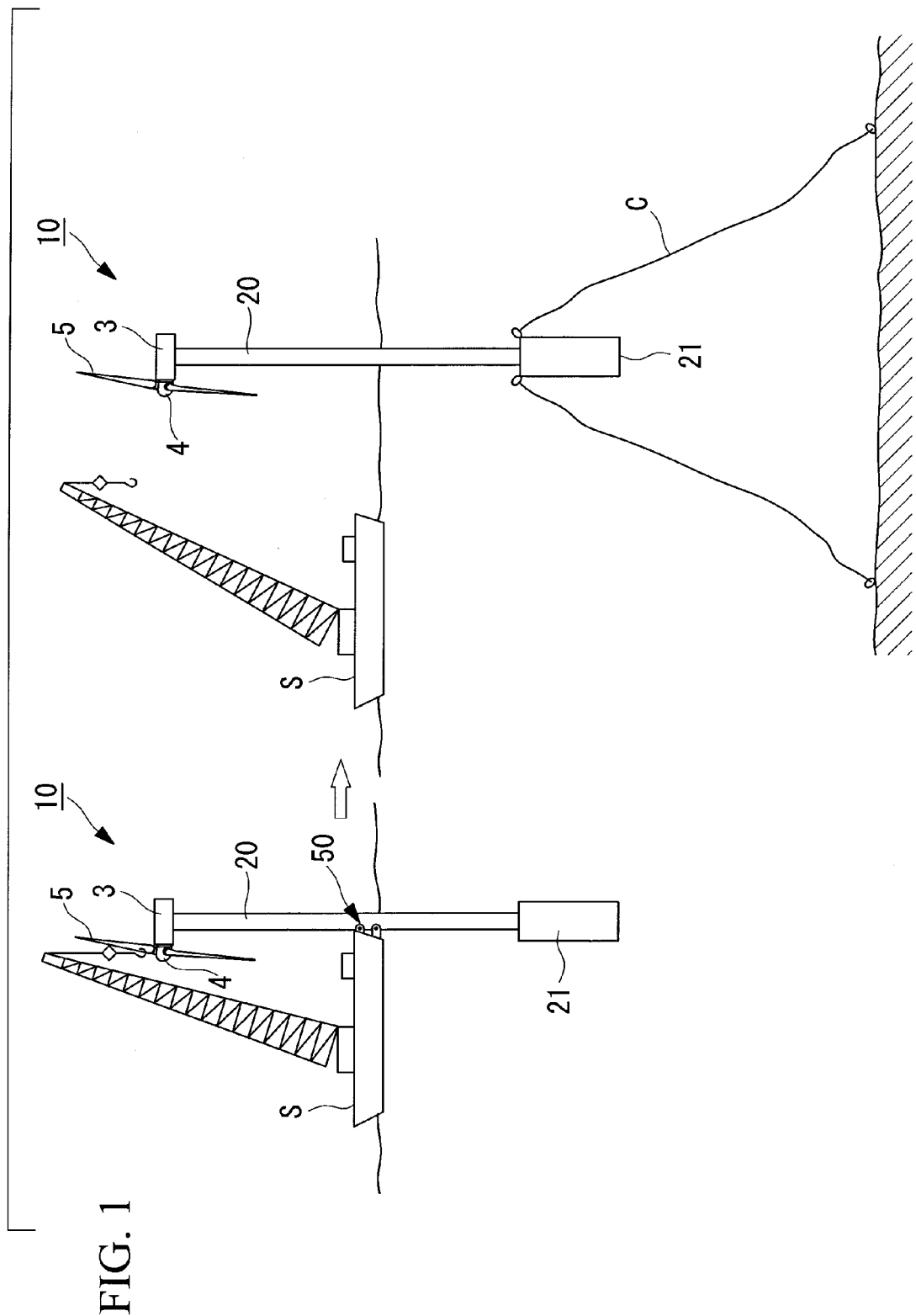
FIG. 1 is an explanatory diagram outlining an embodiment of a construction method and construction apparatus for an offshore wind turbine generator according to the present invention.

10: offshore wind turbine generator (floating type)
20: tower member (tower)
21: ballast
22: undersea tower section
23: oversea tower section
25: flange
26: protrusion
50: construction apparatus
51, 51A, 51B: guide member
52: hydraulic cylinder
53: sliding mechanism
55: extension/retraction mechanism
60: arm unit
61: slider
70, 70', 80, 90: gripper
71: gripper body
73: holder
74: holding piece
91: roller (rolling element)
S: crane ship
C: anchoring cable

BEST MODE FOR CARRYING OUT THE INVENTION

An embodiment of a construction apparatus and construction method for an offshore wind turbine generator according to the present invention will now be described with reference to the drawings.

Referring to FIG. 1, a floating offshore wind turbine generator (hereinafter referred to as an "offshore wind turbine") 10 includes a nacelle 3, that slews depending on wind direction, disposed at the top end of a tower member (tower) 20. A rotor head 4 is attached to the front end of the nacelle 3 so as to rotate together with a plurality of wind turbine blades 5 protruding in the radial direction. The nacelle 3 accommodates equipment such as a gear box and a generator (not shown).

The illustrated offshore wind turbine 10 is a monopole floating wind turbine having a ballast (floating body) 21 at the bottom end of the tower member 20. This floating offshore wind turbine 10 is disposed in deep sea so as to be floated by the undersea tower buoyancy of the ballast 21 and is fixed to the seabed with anchoring cables C. That is, the tower member 20 of the floating offshore wind turbine 10 is not fixed to the seabed with a foundation therebetween, but is fixed to the seabed with the anchoring cables C so as to be floated in a desired sea area.

Figure 2:
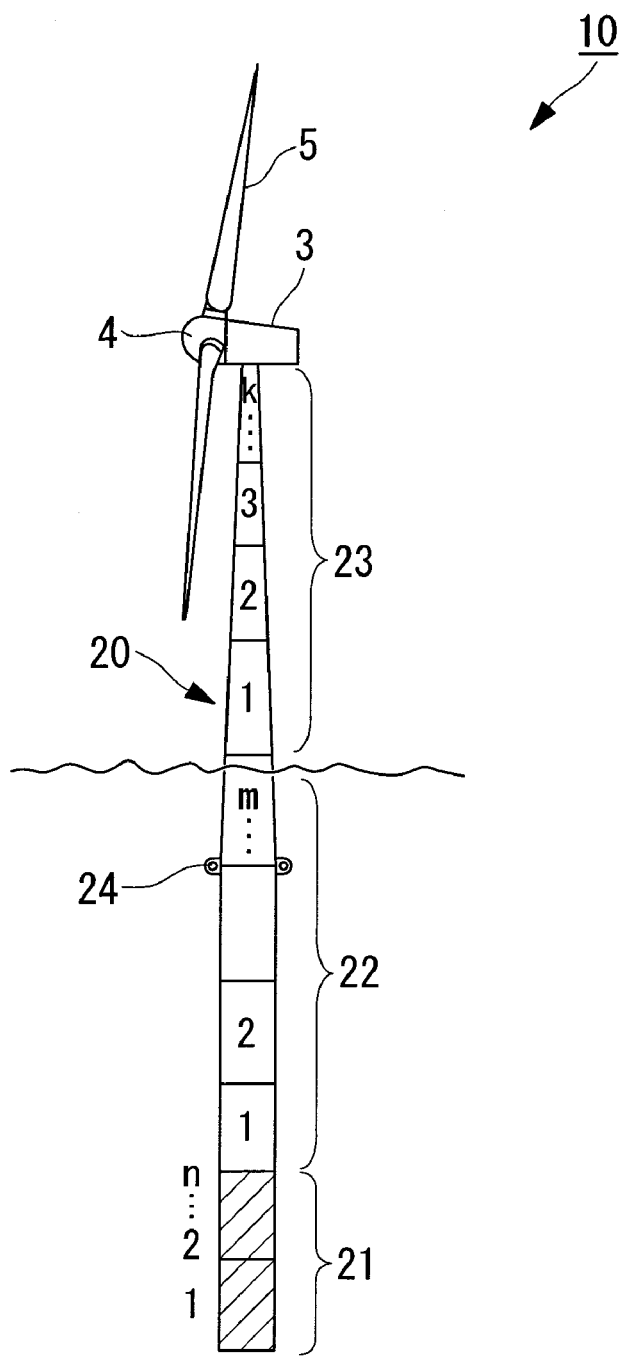
FIG. 2 is a diagram showing an example of the configuration of a tower member of the offshore wind turbine generator shown in FIG. 1.

As shown in FIG. 2, for example, the tower member 20 of the offshore wind turbine 10 is divided into a plurality of segments in the axial direction. That is, the tower member 20 is divided into a plurality of pillar segments in the axial direction that are coupled together above the sea.

The illustrated tower member 20 includes the ballast 21, which is the bottommost section; an undersea tower section 22 coupled to the top of the ballast 21 and located under the sea in a normal installation state; and an oversea tower section 23 coupled to the top of the undersea tower section 22 and exposed above the sea in a normal installation state. The nacelle 3 is disposed at the top end of the oversea tower section 23, which is the topmost section of the tower member 20.

In FIG. 2, the ballast 21 is divided into n segments in the axial direction, the undersea tower section 22 is divided into m segments, and the oversea tower section 23 is divided into k segments. The numbers of segments, namely, k, m, and n, are changed as needed depending on various conditions that vary with the output power of the offshore wind turbine 10 (e.g., the length of the wind turbine blades 5).

In FIG. 2, reference sign 24 denotes anchor portions to which ends of the anchoring cables C are fastened.

As shown in FIG. 1, for example, the floating offshore wind turbine 10 described above is constructed (installed) at a predetermined offshore position using a crane ship S.

The crane ship S is equipped with a construction apparatus 50, described below, for the offshore wind turbine 10. This construction apparatus 50 grips the tower member 20 and joins it to the crane ship S to allow construction work without relative misalignment resulting from rolling due to ocean waves.

Figure 3:
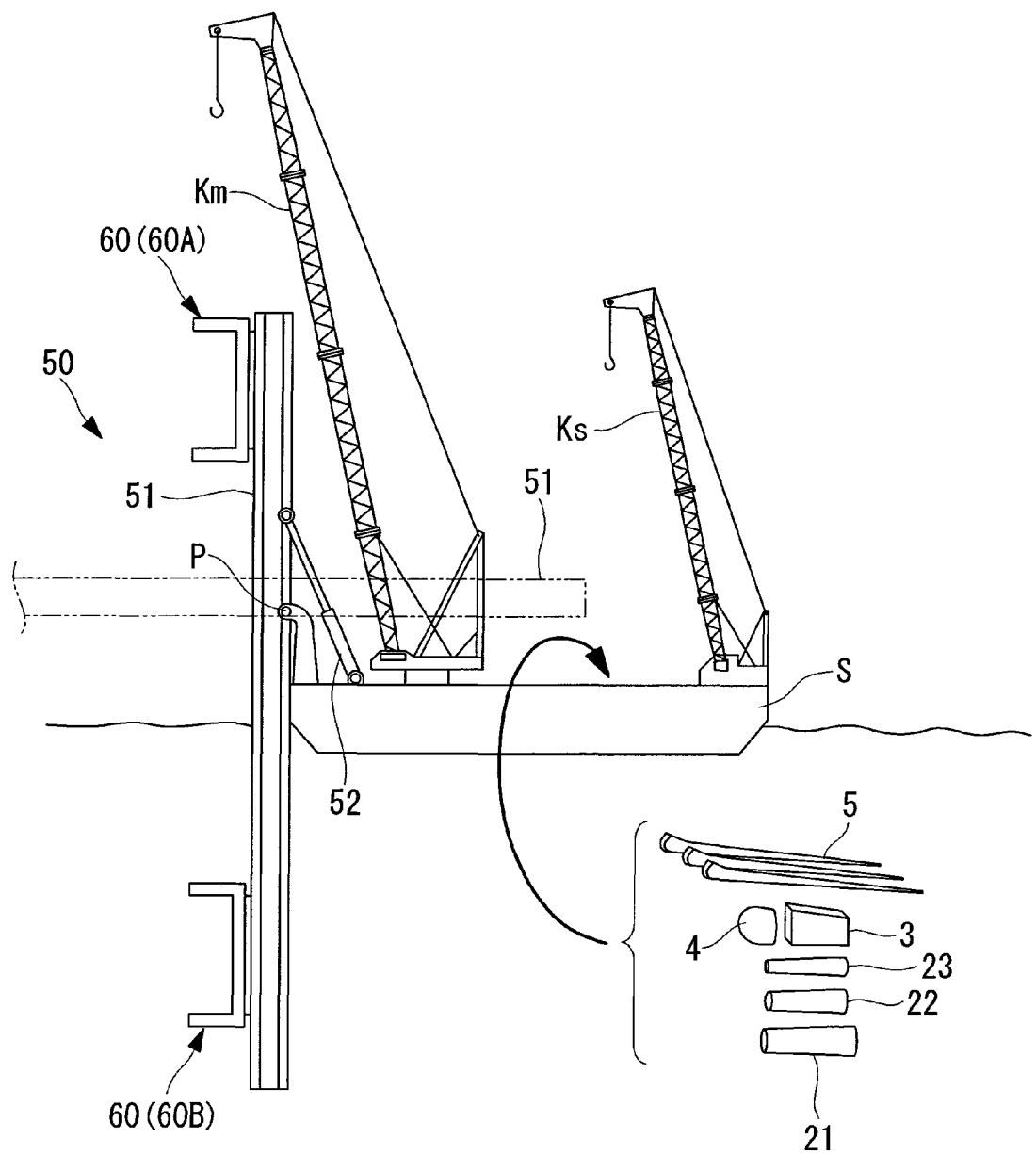
FIG. 3 is a diagram showing an example of the configuration of the construction apparatus for the offshore wind turbine generator, mounted on a crane ship shown in FIG. 1.

As shown in FIG. 3, for example, the construction apparatus 50 for the offshore wind turbine 10 includes a guide member 51 attached to the crane ship S in a work position substantially perpendicular thereto such that the bottom end of the guide member 51 is disposed under the sea and at least one pair of arm units 60 that slide along the guide member 51. In the exemplary configuration shown, a pair of top and bottom arm units 60 are provided; they will be distinguished as a top arm 60A and a bottom arm 60B in the description below as needed.

In addition, the above arm units 60 include grippers 70 capable of holding and releasing the tower member 20 divided into the plurality of segments in the axial direction.

A main crane Km and a subcrane Ks are mounted on the illustrated crane ship S. The main crane Km and the subcrane Ks are used for loading/construction work, such as erecting and hoisting, for the components of the offshore wind turbine 10, which are separately loaded onto the crane ship S, including the nacelle 3, the rotor head 4, the wind turbine blades 5, the ballast 21, the undersea tower section 22, and the oversea tower section 23.

The above components of the offshore wind turbine 10 may be loaded onto and transported by the crane ship S, or may be transported by another ship and then transferred to the crane ship S for construction using, for example, the main crane Km.

The guide member 51 is disposed, for example, at the front of the crane ship S. This guide member 51 is an elongated rigid member extending vertically in a predetermined work position, and the bottom end thereof is disposed under the sea.

In addition, the above guide member 51 has a rotation mechanism as described below. This rotation mechanism is an apparatus capable of changing the attitude of the guide member 51 by rotating it about a fulcrum P between the work position of the guide member 51, as indicated by the solid lines in FIG. 3, and the sailing position of the guide member 51, as indicated by the imaginary lines, by means of, for example, extension/retraction operation of a hydraulic cylinder 52. That is, the guide member 51 with the rotation mechanism is attached to the crane ship S so as to be rotatable between the sailing position, which is substantially horizontal, i.e., parallel to the crane ship S, and the work position, which is substantially vertical, so that the guide member 51 does not obstruct sailing when the crane ship S moves to a construction site.

Figure 4:
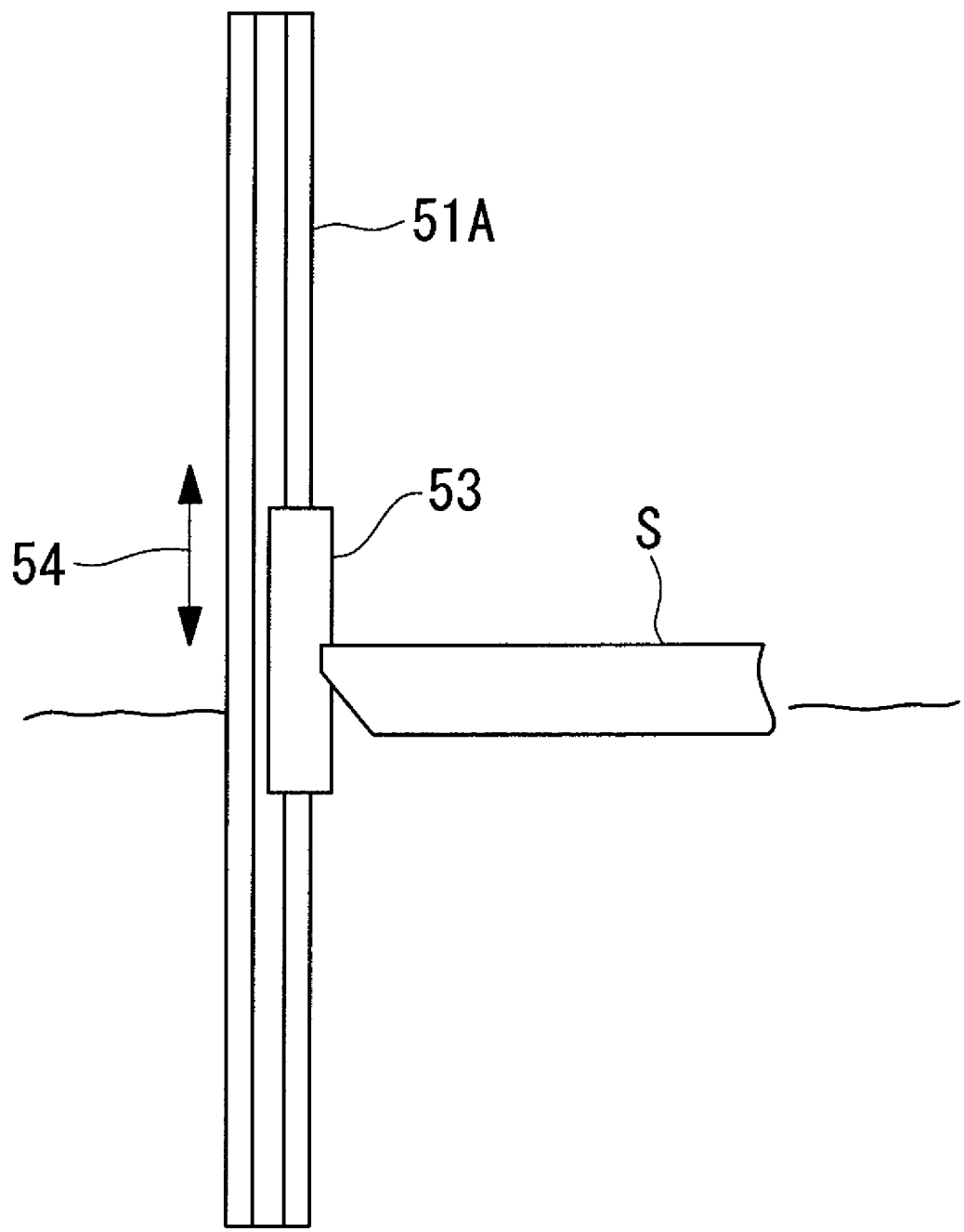
FIG. 4 is a diagram showing a first modification of the relevant part of the construction apparatus in FIG. 3.

Alternatively, the above rotation mechanism of the guide member 51 may be replaced with, for example, a sliding mechanism of a first modification shown in FIG. 4.

In this modification, a guide member 51A can be slid vertically (see the arrow 54 in the drawing) by a sliding mechanism 53 fixed to and supported by the crane ship S. Specifically, the sliding mechanism 53 can keep the bottom end of the guide member 51A lifted out of the sea during sailing of the crane ship S and can keep the bottom end of the guide member 51A under the sea in the normal work position. As a result, the bottom end of the guide member 51A can be lifted out of the sea during sailing of the crane ship S, or the length of the guide member 51A under the sea can be decreased, whereas the bottom end of the guide member 51A can be kept under the sea in the normal work position. In addition, the optimum position of the guide member 51A for working can be set by operating the sliding mechanism 53 depending on, for example, the lengths of the components of the tower member 20, which vary with the type of offshore wind turbine 10 to be constructed. The guide member 51A with the sliding mechanism 53 may have the rotation mechanism described above between the sliding mechanism 53 and the crane ship S, particularly if the guide member 51A has a large overall length.

Figure 5:
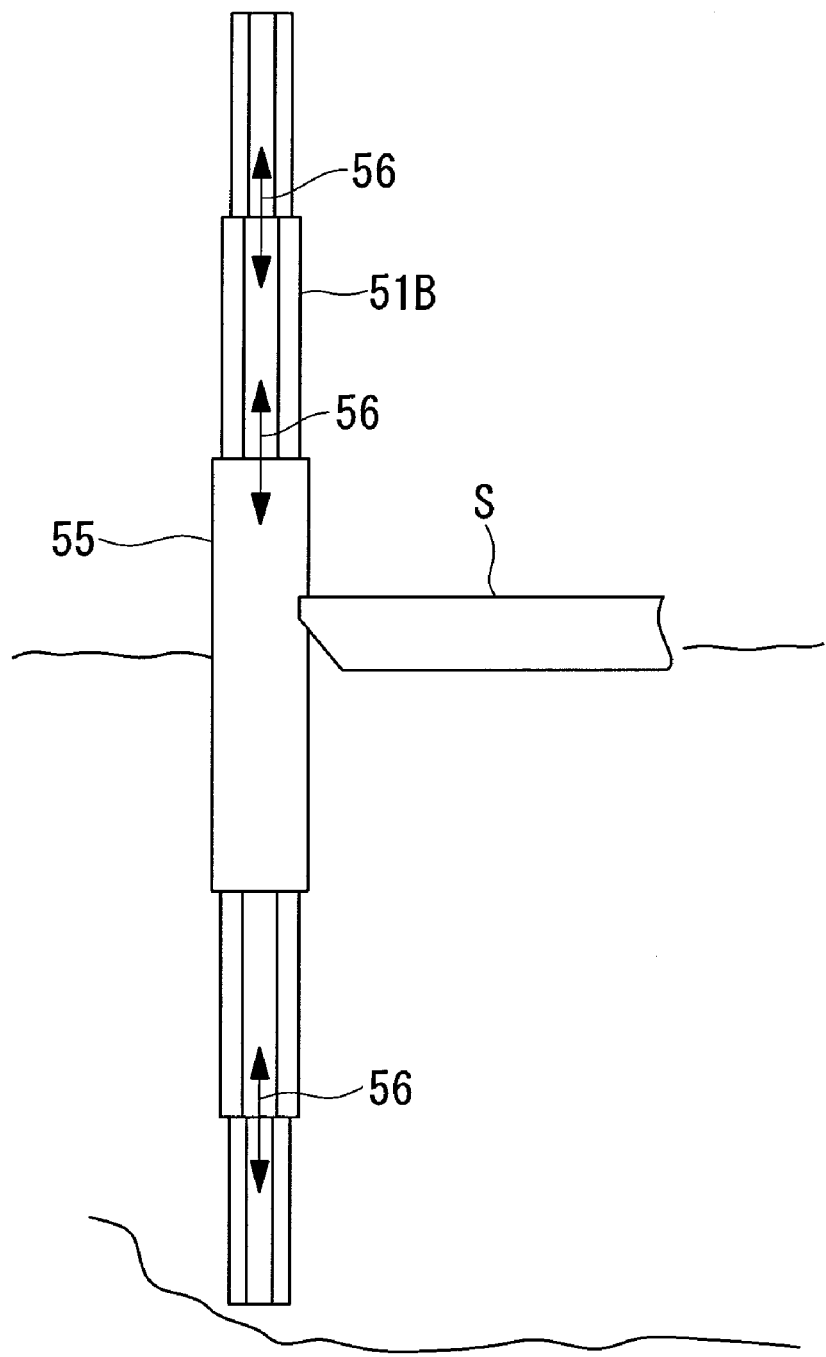
FIG. 5 is a diagram showing a second modification of the relevant part of the construction apparatus in FIG. 3.

Alternatively, the above rotation mechanism of the guide member 51 may be replaced with, for example, an extension/retraction mechanism of a second modification shown in FIG. 5.

In this modification, the length of a guide member 51B in the vertical direction (see the arrow 56 in the drawing) can be changed by an extension/retraction mechanism 55 fixed to and supported by the crane ship S. Specifically, the length of the guide member 51B in the axial direction is decreased by operating the extension/retraction mechanism 55 during sailing of the crane ship S and is increased by operating the extension/retraction mechanism 55 in the normal work position. As a result, the bottom end of the guide member 51B can be lifted out of the sea during sailing of the crane ship S, or the length of the guide member 51B under the sea can be decreased, whereas the bottom end of the guide member 51B can be kept under the sea in the normal work position. In addition, the optimum length and position of the guide member 51B for working can be set by operating the extension/retraction mechanism 55 depending on, for example, the lengths of the tower components, which vary with the type of tower member 20 of the offshore wind turbine 10 to be constructed.

The guide member 51B with the extension/retraction mechanism 55 may also be combined with at least one of the rotation mechanism and the sliding mechanism 53 described above, particularly if the guide member 51B has a large overall length. A configuration (not shown) using gears, pulleys, wires, and so on by which the guide member 51B can be moved as if it were rotated by a hydraulic cylinder is also encompassed.

Figure 6:
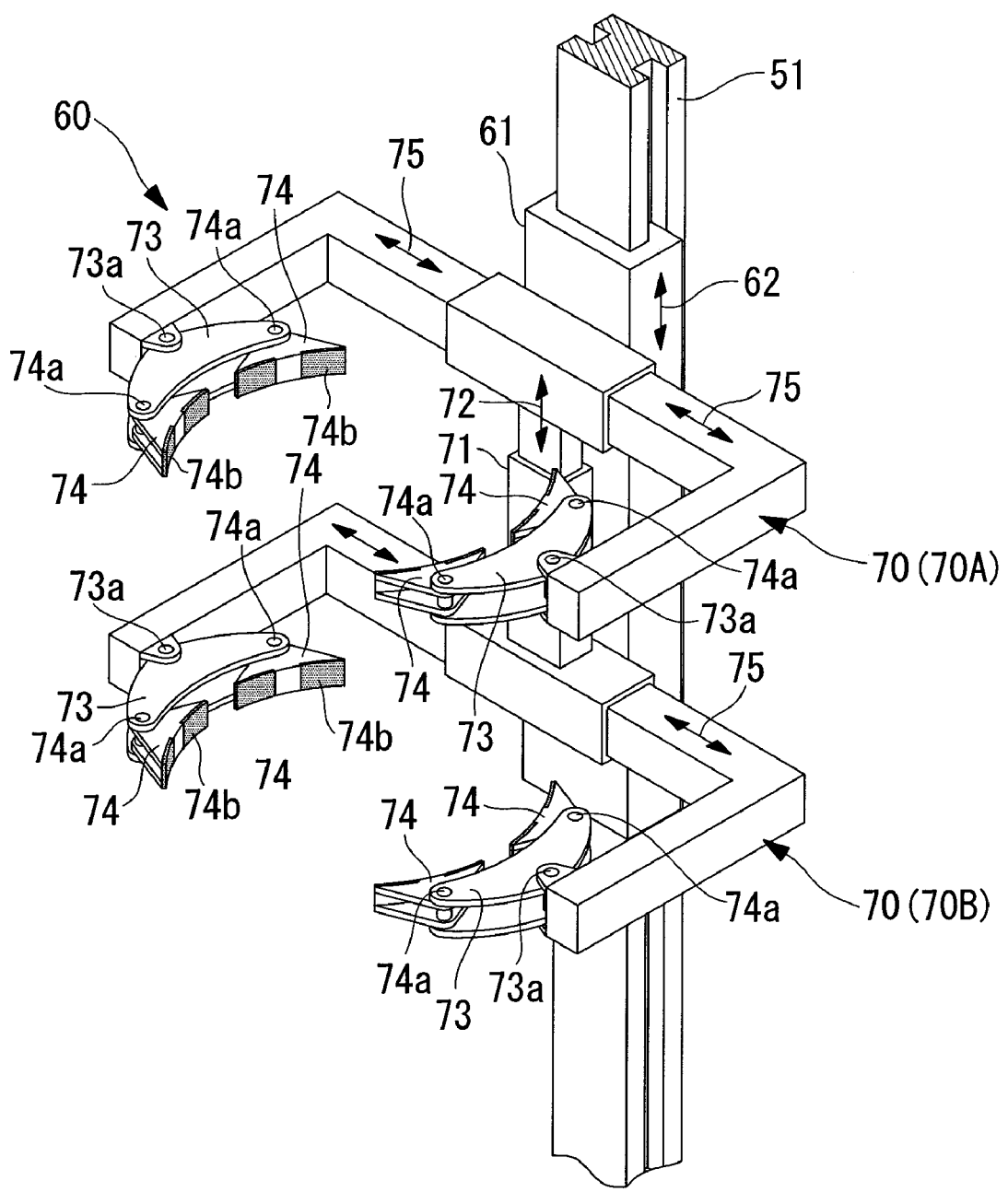
FIG. 6 is a diagram showing a specific example of the configuration of an arm unit of the construction apparatus in FIG. 3.

As shown in FIG. 6, for example, the arm units 60 include a slider 61 that moves along the guide member 51 described above. This slider 61 is slidable in the axial direction (longitudinal direction) of the guide member 51, as indicated by the arrow 62 in the drawing. At least one pair of top and bottom arm units 60 are provided for one guide member 51.

The above arm units 60 include a plurality of sets of grippers 70 capable of holding and releasing the tower member 20 divided into the plurality of segments in the axial direction. In the exemplary configuration shown, the arm unit 60 includes two sets of grippers 70 whose distance from each other in the axial direction is changeable. In the description below, the individual grippers 70 will be distinguished as needed by referring to the grippers 70 located upward in the vertical direction as upper arm parts 70A and to the grippers 70 located downward in the vertical direction as lower arm parts 70B.

In the above exemplary configuration of the grippers 70, specifically, a gripper body 71 is fixed to and supported by the arm unit 60 so that they move together.

The gripper body 71 is provided with the upper arm parts 70A and the lower arm parts 70B so that their distance from each other in the axial direction is changeable by extension/retraction in the axial direction of the guide member 51 (see the arrow 72 in the drawing).

The upper arm parts 70A and the lower arm parts 70B are formed of pairs of left and right L-shaped members and have pairs of left and right holders 73 that follow the shapes of the ballast 21, the undersea tower section 22, and the oversea tower section 23, into which the tower member 20 is divided. The holders 73 are supported so as to be swingable about pins 73a relative to the L-shaped upper arm parts 70A and lower arm parts 70B.

The holders 73 each have a pair of holding pieces 75 attached thereto. The holding pieces 74 are supported so as to be swingable about pins 74a. The holding pieces 74 have holding surfaces 74b that are curved surfaces corresponding to the circular cross section of the tower member 20, and antiskid pads such as rubber pads are attached thereto as needed.

The above upper arm parts 70A and lower arm parts 70B are opened and closed in the horizontal direction (see the arrows 75 in the drawing), which is perpendicular to the vertical direction, indicated by the arrow 72 in the drawing. As a result, when the upper arm parts 70A and the lower arm parts 70B are closed, the four holding pieces 74 are pressed against the outer circumferential surface of a segment of the tower member 20 present between the pairs of opposing left and right holders 73. Because the pins 73a swingably support the holders 73 and the pins 74a swingably support the holding pieces 74, the holding surfaces 74b of the holding pieces 74 closely contact the ballast 21, the undersea tower section 22, and the oversea tower section 23 while absorbing the difference in outer diameter therebetween. The upper arm parts 70A and the lower arm parts 70B can therefore reliably grip the ballast 21, the undersea tower section 22, and the oversea tower section 23.

When the upper arm parts 70A and the lower arm parts 70B grip the tower member 20 of interest, they can be made to grip the optimum positions thereof by adjusting, for example, the position of the slider 61 and the distance between the upper arms 70A and the lower arms 70B in the axial direction.

The movement of the slider 61, the change in the distance between the upper arm parts 70A and the lower arm parts 70B in the axial direction, and the opening/closing movement of the upper arm parts 70A and the lower arm parts 70B may be accomplished by a known actuation mechanism such as a hydraulic cylinder or a rack and pinion.

Figure 7:
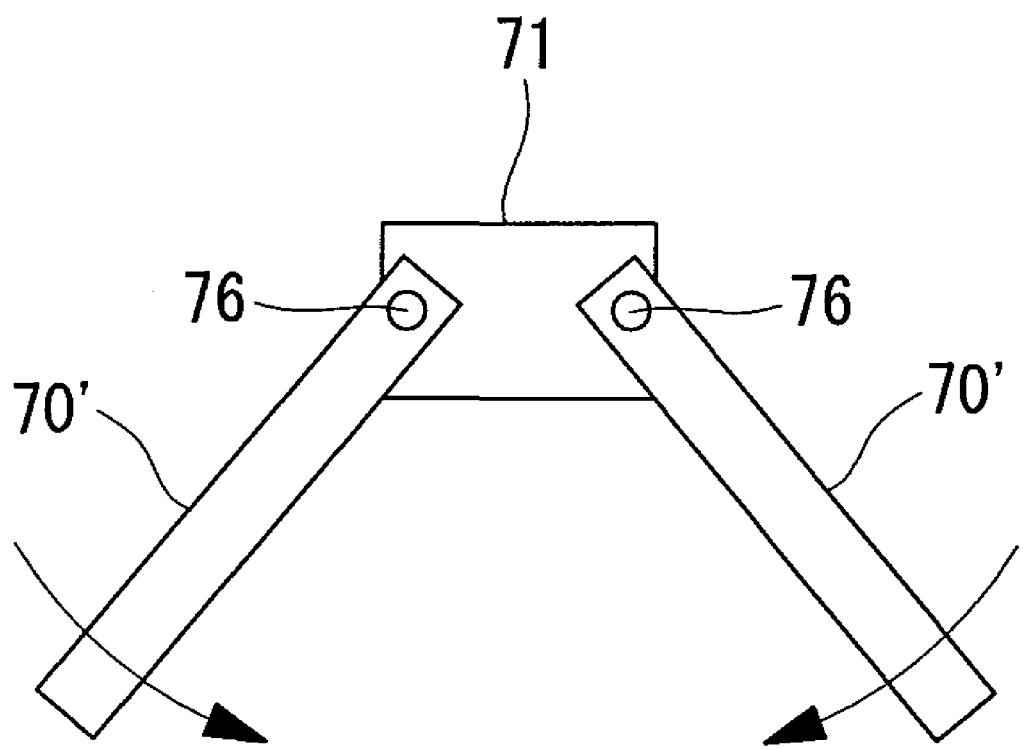
FIG. 7 is a diagram showing a first modification of the relevant part of the arm unit in FIG. 6.

In addition, the type of upper arm parts 70A and lower arm parts 70B is not limited to the gripping method in which they are opened and closed by sliding. As in a first modification shown in FIG. 7, for example, grippers 70' supported so as to be swingable about pins 76 may be used so that they are opened and closed. In FIG. 7, the swingable holders 73, the holding pieces 74, and so on are not shown.

Figure 8:
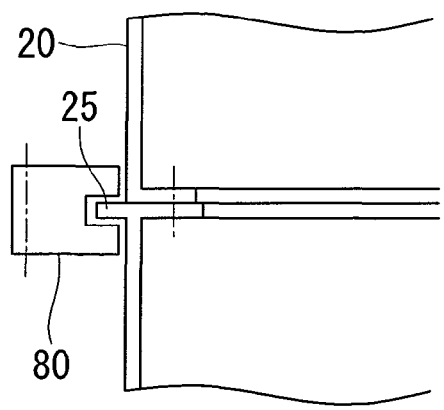
FIG. 8 is a diagram showing a second modification of the relevant part of the arm unit in FIG. 6.

In addition, FIG. 8 shows a second modification of the grippers 70 or holding pieces 74 of the arm units 60. In this method, grippers 80 hold grip portions, such as flanges 25, provided on the segments of the tower member 20 described above, rather than holding the outer circumferential portions thereof. In this case, the grip portions are not limited to the flanges 25 for coupling the segments of the tower member 20, but may be protrusions such as pins.

Figure 9:
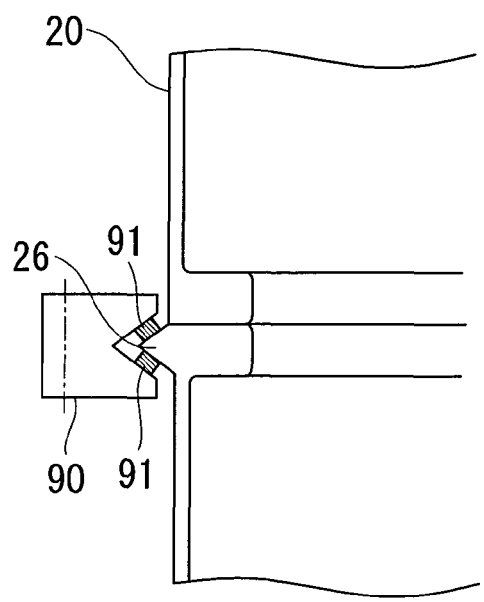
FIG. 9 is a diagram showing a third modification of the relevant part of the arm unit in FIG. 6.

In a third modification shown in FIG. 9, additionally, protrusions 26 with a triangular cross section are provided on the segments of the tower member 20, and rolling elements such as rollers 91 are disposed between the protrusions 26 and grippers 90. This configuration permits rotation of the tower member 20 relative to the grippers 90 so that flange bolt holes of the segments of the tower member 20 can readily be aligned.

Although the tower member 20 is rotatable in the configuration shown, for example, the grippers 80 or 90 may be rotatable relative to the arm units 60 so that they rotate together with the gripped tower member 20.

The construction apparatus 50, thus configured, for the offshore wind turbine 10 includes the guide member 51 attached to the crane ship S in the work position substantially perpendicular thereto such that the bottom end of the guide member 51 is disposed under the sea and at least one pair of arm units 60 that include the grippers 70 capable of holding and releasing the tower member 20 divided into the plurality of segments in the axial direction and that slide along the guide member 51, so that the arm units 60 can grip the tower member 20, specifically, the segments of the tower member 20 (the ballast 21, the undersea tower section 22, and the oversea tower section 23), and join it to the crane ship S. As a result, the crane ship S and the segments of the tower member 20 on the sea are made to roll substantially together by ocean waves, so that construction work can be carried out without relative misalignment therebetween resulting from rolling due to ocean waves.

In this case, because the arm units 60 include the plurality of sets of grippers 70 whose distance from each other in the axial direction is changeable, they can reliably grip positions where a good balance is achieved even if the length of the tower member 20 is changed.

Figure 10:
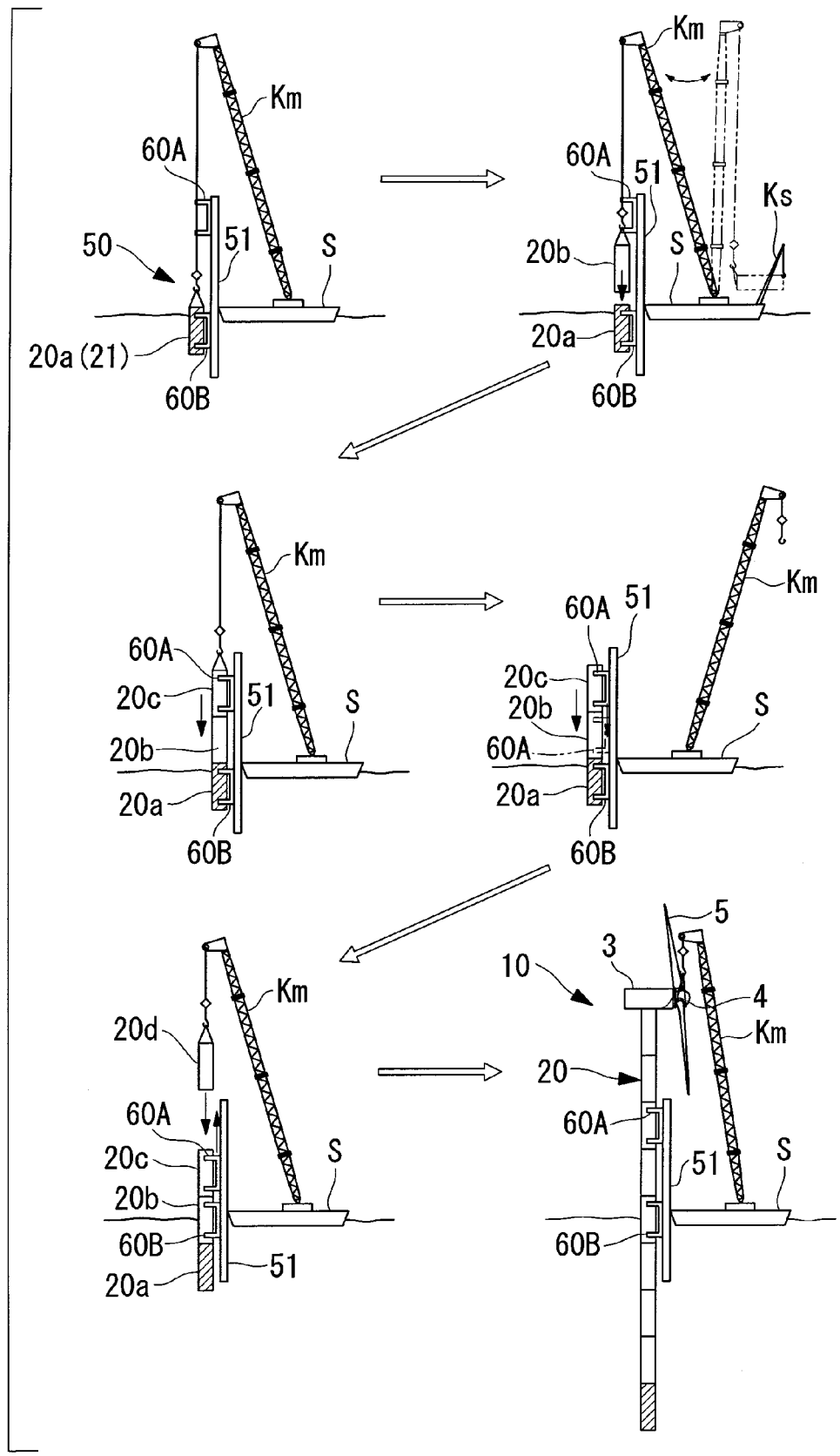
FIG. 10 is an explanatory diagram showing the process of a construction method using the construction apparatus for an offshore wind turbine according to the present invention.
Figure 11:
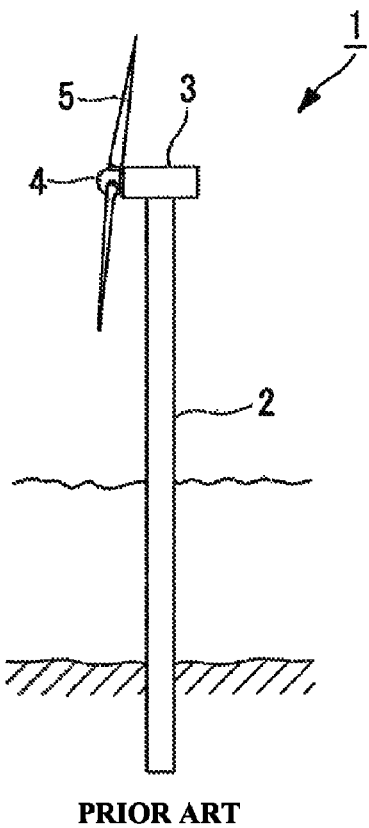
FIG. 11 is a diagram showing a monopile offshore wind turbine generator.
Figure 12:
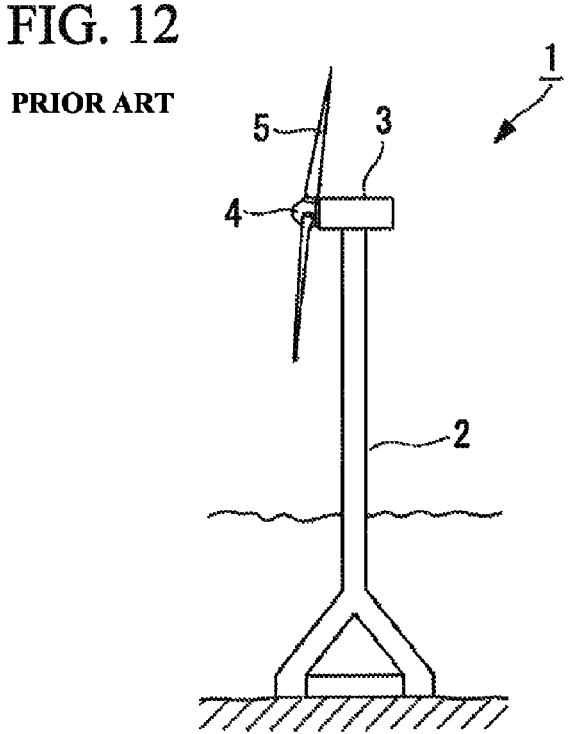
FIG. 12 is a diagram showing a fixed offshore wind turbine generator.
Figure 13:
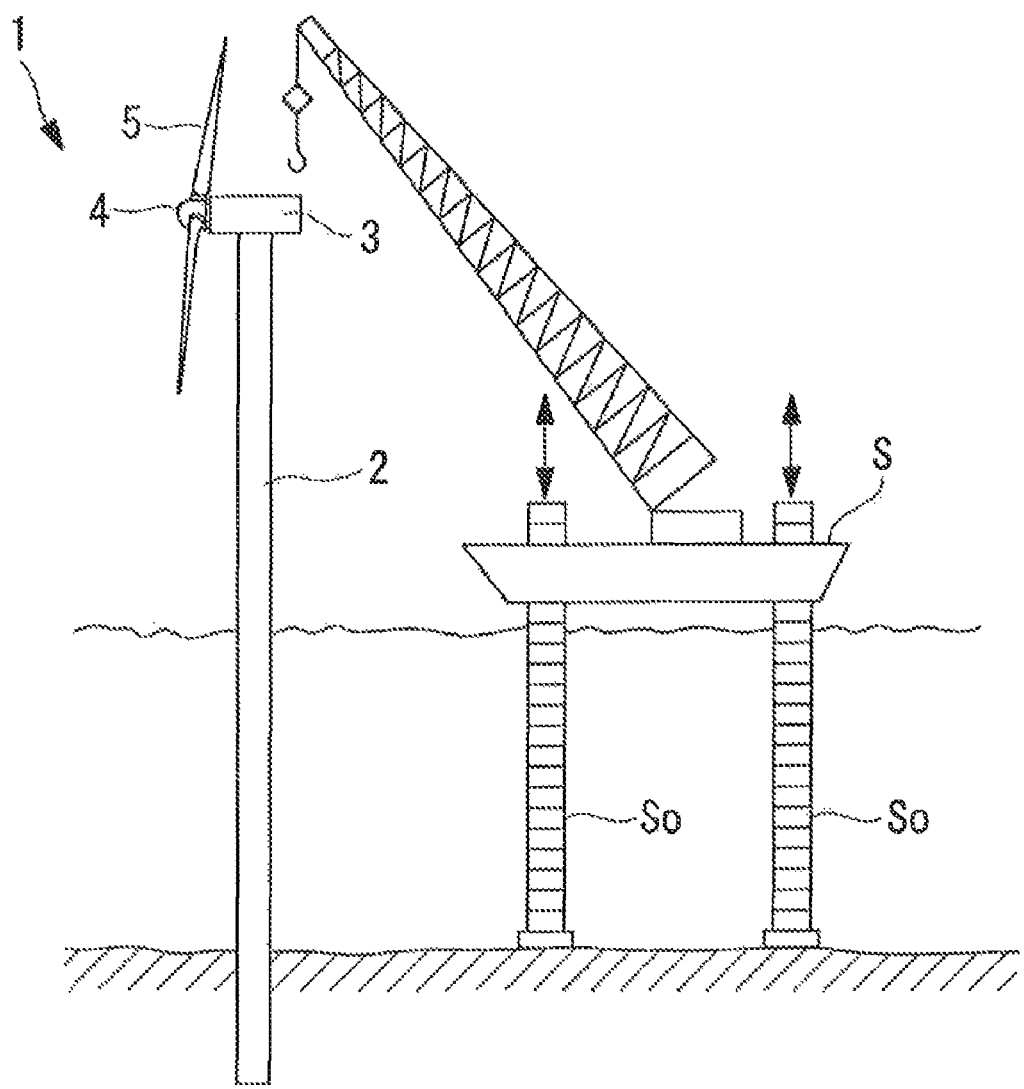
FIG. 13 is a diagram showing an example of a method for constructing an offshore wind turbine generator using outriggers of a crane ship as a conventional example.

A construction method for constructing the offshore wind turbine 10 using the above construction apparatus 50 such that the segments of the tower member 20 are joined to the crane ship S will now be described with reference to the process chart shown in FIG. 10. In this case, the construction apparatus 50 shown in FIG. 3 has the arm units 60 shown in FIG. 6, and the subcrane Ks of the crane ship S is omitted from the drawing unless necessary.

In the first step, as the first segment of the tower member 20, the ballast 21 is hoisted by the main crane Km of the crane ship S. At this time, if the ballast 21 is divided into a plurality of segments, the bottommost segment is hoisted. The ballast 21 thus hoisted is moved close to the guide member 51 by the main crane Km and is gripped by the bottom arm 60B.

For illustration purposes, the bottommost segment gripped by the bottom arm 60B in this step, namely, the ballast 21, is referred to as a segment 20a, and the segments to be subsequently coupled to the top of the segment 20a are referred to as segments 20b, 20c, . . . . That is, the plurality of tower segments (segments) of the ballast 21, the undersea tower section 22, and the oversea tower section 23 are described without being distinguished unless necessary.

In the second step, the next segment 20b is mounted on and joined to the ballast 21 (segment 20a). In this case, the segment 20b is the second bottommost ballast segment if the ballast 21 is divided into a plurality of segments and is the bottommost segment of the undersea tower section 22 if the ballast 21 is not divided.

In the third step, the next segment 20c is mounted on and joined to the topmost portion of the segment 20b and is gripped by the top arm 60A.

In the fourth step, the segment 20a is released from the bottom arm 60B and is freed. The top arm 60A then moves (slides) downward along the guide member 51 while gripping the segment 20c. In this case, the amount of downward movement is roughly equivalent to the length of the single segment 20a, and the bottom arm 60B can therefore grip the segment 20b after the movement is completed.

In the fifth step, the next segment 20d is mounted on and joined to the topmost portion. The top arm 60A then releases the segment 20c, moves upward, and grips the topmost segment 20d.

The process returns to the third step described above, and the third to fifth steps, forming one cycle, are repeated by the required number of cycles (the number of segments remaining). As a result, the plurality of segments of the tower member 20 are coupled together with the tower member 20 being gripped at two upper positions by the top arm 60A and the bottom arm 60B. That is, the construction apparatus 50 joins the tower member 20 to the crane ship S, thus avoiding relative misalignment resulting from rolling due to ocean waves.

In the final step, the assembly of the offshore wind turbine 10 is completed by attaching the nacelle 3 and the rotor head 4 to the top of the completed tower member 20. At this time, for example, attachment bolts and bolt holes can readily be aligned because the crane ship S and the tower member 20 roll together under the effect of ocean waves.

Afterwards, when the offshore wind turbine 10 is detached from the crane ship S, the offshore wind turbine 10 is adjusted to the position where its buoyancy and self weight are balanced by moving the top arm 60A and the bottom arm 60B upward or downward and is then released from the top arm 60A and the bottom arm 60B.

Thus, according to the present invention described above, for example, when the floating offshore wind turbine 10 for installation in a deep sea area is constructed, it can readily be assembled overhead, namely, above the topmost portion of the tower member 20, while avoiding misalignment between the components. That is, the floating offshore wind turbine 10 can be safely and smoothly constructed in deep sea.

Because relative displacement between the crane ship S and the offshore wind turbine 10 can be avoided, the crane ship S equipped with the above construction apparatus 50 is effective not only in newly constructing the offshore wind turbine 10, but also in maintenance work requiring a crane.

That is, the above construction apparatus 50 can be used as maintenance equipment to carry out maintenance work, and the above construction method can be used as a maintenance method in maintenance. As for the details of the maintenance equipment and the maintenance method, the construction and construction work in the construction apparatus and construction method described above may be construed as maintenance and maintenance work.

Thus, in the construction apparatus and construction method and the maintenance method and the maintenance equipment of the present invention, a structure such as that of the above construction apparatus 50 is provided between the crane ship S and the tower member 20 of the offshore wind turbine 10 near the tower bottom (sea level) so that they can be joined together. As a result, when the offshore wind turbine 10 is constructed, the above structure can alleviate or avoid relative displacement between the offshore wind turbine 10 and the crane ship S. The present invention also encompasses joining, for example, the structure of the offshore wind turbine 10 below the sea level to the hull of the crane ship S before mounting the tower member 20 and the nacelle 3.

That is, in the present invention, the docking of the offshore wind turbine 10 with the crane ship S allows them to move in the same way in response to the effect of ocean waves, so that, even though they cannot be completely fixed relative to the ground or the seabed, relative displacement between the crane ship S and the offshore wind turbine 10 can be avoided. Accordingly, the offshore wind turbine 10 can be safely and smoothly constructed in deep sea.

The present invention is not limited to the embodiment described above and can also be used in, for example, maintenance; modifications are permitted as needed without departing from the spirit thereof.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A construction apparatus for constructing a floating offshore wind turbine generator having a tower member with a crane ship, the apparatus comprising:
    a guide member having an axial direction and configured to be attached to the crane ship in a work position perpendicular thereto such that a bottom end of the guide member is disposed under the sea; and at least one pair of arm units attached to the guide member and each of said arm units including a plurality of sets of grippers whose distance from each other in the axial direction is changeable, wherein said plurality of sets of grippers are slidable along the axial direction of the guide member for holding and releasing a tower member divided into a plurality of segments in the axial direction.

2. The construction apparatus for an offshore wind turbine generator according to claim 1, wherein the guide member is rotatable between a sailing position parallel to the crane ship and the work position perpendicular the crane ship.

3. The construction apparatus for an offshore wind turbine generator according to claim 1, further comprising an axially sliding mechanism mounted to the guide member, and/or an extension/retraction mechanism mounted to the guide member for changing the length of the guide member in the axial direction.

4. A construction method for constructing a floating offshore wind turbine generator with a crane ship, wherein the offshore wind turbine generator is constructed using the construction apparatus according to claim 1 such that the tower member is joined to the crane ship.

5. The construction apparatus for an offshore wind turbine generator according to claim 1, wherein said distance between the plurality of sets of grippers in the axial direction is changeable by extension/retraction in the axial direction of the guide member.

6. The construction apparatus for an offshore wind turbine generator according to claim 1, wherein said plurality of sets of grippers of the arm units are openable and closeable for respectively holding and releasing said divided segments of the tower member in a horizontal direction which is substantially perpendicular to the crane ship.

7. The construction apparatus for an offshore wind turbine generator according to claim 6, wherein said plurality of sets of grippers are configured to respectively hold and release flanges of the segments of the tower member in the horizontal direction.

8. The construction apparatus for an offshore wind turbine generator according to claim 6, wherein said plurality of sets of grippers are configured to respectively hold and release protrusions of the segments of the tower member in the horizontal direction, and said construction apparatus further comprises rolling elements connecting said plurality of sets of grippers to said protrusions.

9. Maintenance equipment for maintaining a floating offshore wind turbine generator having a tower member with a crane ship, the equipment comprising:

a guide member having an axial direction and configured to be attached to the crane ship in a work position perpendicular thereto such that a bottom end of the guide member is disposed under the sea; and at least one pair of arm units attached to the guide member and each of said arm units including a plurality of sets of grippers whose distance from each other in the axial direction is changeable, wherein said plurality of sets of grippers are slidable along the axial direction of the guide member for holding and releasing a tower member divided into a plurality of segments in the axial direction.

10. The maintenance equipment for an offshore wind turbine generator according to claim 9, wherein the guide member is rotatable between a sailing position parallel to the crane ship and the work position perpendicular to the crane ship.

11. The maintenance equipment for an offshore wind turbine generator according to claim 9, further comprising an axially sliding mechanism mounted to the guide member, and/or an extension/retraction mechanism mounted to the guide member for changing the length of the guide member in the axial direction.

12. A maintenance method for maintaining a floating offshore wind turbine generator with a crane ship, wherein the offshore wind turbine generator is constructed using the maintenance equipment according to claim 9 such that the tower member is joined to the crane ship.

13. The maintenance equipment for an offshore wind turbine generator according to claim 9, wherein said distance between the plurality of sets of grippers in the axial direction is changeable by extension/retraction in the axial direction of the guide member.

14. The maintenance equipment for an offshore wind turbine generator according to claim 9, wherein said plurality of sets of grippers of the arm units are openable and closeable for respectively holding and releasing said divided segments of the tower member in a horizontal direction which is substantially perpendicular to the crane ship.

15. The maintenance equipment for an offshore wind turbine generator according to claim 14, wherein said plurality of sets of grippers are configured to respectively hold and release flanges of the segments of the tower member in the horizontal direction.

16. The maintenance equipment for an offshore wind turbine generator according to claim 14, wherein said plurality of sets of grippers are configured to respectively hold and release protrusions of the segments of the tower member in the horizontal direction, and said construction apparatus further comprises rolling elements connecting said plurality of sets of grippers to said protrusions.

* * * * *